United States Patent [19]
Lewiner

[11] Patent Number: 4,864,141
[45] Date of Patent: Sep. 5, 1989

[54] SMOKE DETECTOR WITH IONIZATION CHAMBER

[76] Inventor: Jacques Lewiner, 5, rue Bory d'Arnex, 92210 Saint Cloud, France

[21] Appl. No.: 16,378

[22] Filed: Feb. 19, 1987

[30] Foreign Application Priority Data

Feb. 25, 1986 [FR] France ................................ 86 02567

[51] Int. Cl.[4] ................................................ G01T 1/185
[52] U.S. Cl. .................................... 250/381; 250/380; 250/382; 250/384
[58] Field of Search ............... 250/381, 380, 382, 384, 250/385.1

[56] References Cited

U.S. PATENT DOCUMENTS 3,560,737 2/1971 Skildum .............................. 250/384
3,731,093 5/1973 Scheidweiler et al. ............. 250/384
3,767,917 10/1973 Lampart et al. .................... 250/384
3,908,957 9/1975 Schütt ................................ 250/384
4,171,486 10/1979 Dobrzanski ......................... 250/381
4,185,196 1/1980 Byrne ................................. 250/381
4,227,085 10/1980 Sunde ................................. 250/384
4,488,044 12/1984 Rork et al. .......................... 250/381
4,564,762 1/1986 Doherty et al. .................... 250/381

*Primary Examiner*—Janice A. Howell
*Assistant Examiner*—William F. Rauchholz
*Attorney, Agent, or Firm*—Larson and Taylor

[57] ABSTRACT

A smoke detector is provided having an ionization chamber (1). For counterbalancing the removal of ions ($5_1$), taken out of the chamber by the violent air currents (C) passing through this chamber, these air currents are previously enriched with ions ($7_1$), by causing them to pass through an ion reservoir (6) before being introduced into said chamber

9 Claims, 1 Drawing Sheet

SMOKE DETECTOR WITH IONIZATION CHAMBER

BACKGROUND OF THE INVENTION

The invention relates to devices for detecting the presence of smoke, dust or similar particles in the ambient atmosphere, which devices include an ionization chamber whose inner volume is placed in communication with said atmosphere and means for measuring the ionic current created in this chamber. Said ionization chamber itself includes a source of ionizing radiation, generally formed by an $\alpha$ or $\beta$ radioactive substance, capable of ionizing the air contained in the chamber, two electrodes enclosing a portion at least of the volume thus ionized and means for applying a DC electric voltage between these two electrodes, which creates the ionic current to be measured between said electrodes.

The presence of smoke or other polluting agents in the chamber considered results in constituent particles of this agent being fixed on the ions present in this chamber, which makes them heavier, slows them down and reduces the intensity of the corresponding ionic current.

The variation of this intensity is used for detecting such a presence and for triggering an alarm as soon as the concentration of the polluting agent exceeds a predetermined threshold.

Such a device serves preferably for detecting fires from the smoke or fumes which they release and, in order to simplify the description, but of course in a non limitative way, the polluting agent will be designated hereafter by the word "smoke".

The movements of the ambient air in the immediate vicinity of the detector device of the kind in question may adversely affect the detections which it ensures.

In fact, an air stream sweeping the inner volume of the ionization chamber carries along with it some of the ions which pass between the two electrodes of this chamber, which reduces the ionic current even in the absence of smoke: such removal of ions may ultimately trigger off false alarms.

To get over such a drawback, a number of solutions have already been proposed, of a mechanical kind (such as the addition of baffles or deflecting flaps for reducing the violence of the winds admitted into the chamber) and/or of an electric kind (such as the construction of electrodes having a form such that the particles and ions carried along by the air currents are sent to regions where a high electric field reigns).

But these solutions all have drawbacks such as reduction of the sensitivity of the detector and/or increase in the price and fragility.

SUMMARY OF THE INVENTION

The aim of the invention is especially to overcome these different drawbacks.

For this, the ionization chamber smoke detecting devices of the invention are essentially characterized in that they include at least one ion reservoir independent of said chamber adapted and disposed so as to be swept by at least a part of the disturbing air currents before passage thereof into at least a part of the ionization chamber.

During sweeping of this reservoir, the air currents considered take off some of the ions present in said reservoir, then they introduce these ions into the chamber, which compensates for the ions taken out of this chamber by the same air currents.

In preferred embodiments, recourse is further had to one and/or the other of the following arrangements:

the smoke detecting device has a high symmetry of revolution about an axis so as to lend itself to substantially omnidirectional penetration of the ambient smoke, the ion reservoir is disposed inside the ionization chamber, preferably in a central position of this chamber, the ionization chamber is in a central position with respect to the ion reservoir, which includes at least two portions enclosing or surrounding this chamber, the ion reservior is formed by a conducting cage containing a source of ionizing radiation and having good transparency not only to the radiation emitted by this source, but also to the ions generated by this radiation, to the disturbing air currents and to the smoke particles to be detected, the cage is formed by crossed semicircular hoops, the cage is formed by crossed semicircular hoops, the cage forms one of the two electrodes of the ionization chamber, the ionizing radiation source which generates the ions of the ionization chamber is the same as that generating the ions of the ion reservoir, the ionizing radiation source is formed by a radioactive substance, deflectors are provided for directing at least a part of the air currents coming from the outside towards the ion reservoir before introduction thereof into at least a part of the ionization chamber.

The invention includes, apart from these main arrangements, certain other arrangements which are preferably used at the same time and which will be more explicitly discussed hereafter.

BRIEF DESCRIPTION OF THE DRAWINGS

In what follows, several embodiments of the invention will be described with reference to the accompanying drawings in a way which is of course in no wise limitative.

DETAILED DESCRIPTION OF THE INVENTION

Figure 1:
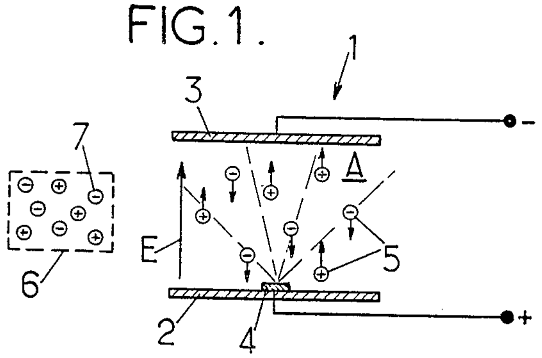
FIGS. 1 and 2 of these drawings show very schematically a smoke detector constructed in accordance with the invention, FIG. 1 corresponding to operation without wind and FIG. 2 to operation with wind.

In a way known per se, the ionization or measuring chamber 1 includes two electrodes 2 and 3 (FIG. 1) defining therebetween a volume A in which is located a radioactive substance 4.

This substance ionizes the air contained in volume A by creating therein positive and negative ions 5 shown respectively by the signs + and −.

A DC electric voltage is applied between the two electrodes, which creates an electric field E and consequently an ionic current between these electrodes, as is shown by the small arrows extending from the ions.

Means are further provided for measuring the resultant electric current, which remains constant under normal operating conditions, that is to say in the absence of smoke in volume A.

If smoke, coming for example from a fire, is introduced into this volume A, the particles of this smoke fix themselves on the ions 5, which makes them heavier and slows them down.

The electric current measured then decreases and this decrease is used for triggering an alarm signal when it exceeds a predetermined threshold.

If volume A is swept by a wind or violent air current C (FIG. 2), some of the ions 5 contained between electrodes 2 and 3, which ions are designated by the reference $5_1$, are carried along by this wind and removed from chamber 1.

If no precaution is taken for overcoming such sweeping away of ions, the result is a reduction of the ionic current generated in chamber 1 and this reduction may be the cause of false alarms.

To overcome such removal, in accordance with the invention, the very phenomenon is used which is at the origin of such removal, namely the driving or sweeping along of ions by the wind, so as to introduce into the ionization chamber new ions compensating for those removed.

To this end, said wind, before passing through the chamber, is caused to pass through a reservoir 6 of ions 7 independent of this chamber.

The result is that ions are driven or swept out of said reservoir, which ions are designated by the reference $7_1$, and which are then introduced into chamber 1.

The characteristics of reservoir 6 (position, ion concentration...) are chosen so that the ionic compensation obtained inside chamber 1 is total when winds C of a predetermined speed appear, namely those from which it is essentially desirable to protect the detector.

In other words, the number of ions $7_1$ taken per unit of time from reservoir 6 and introduced into chamber 1 by such winds C is equal to that of the ions $5_1$ removed from said chamber in the same time and by the same winds.

Reservoir 6 is preferably defined by a cage made from a conducting material forming a Faraday cage and containing a radioactive source capable of ionizing the volume of air inside this cage.

This latter must be permeable to wind C, charged or not with smoke to be detected, to the radiation emitted by the source and to the ions $7_1$, carried along by these winds outside said cage.

Figure 2:
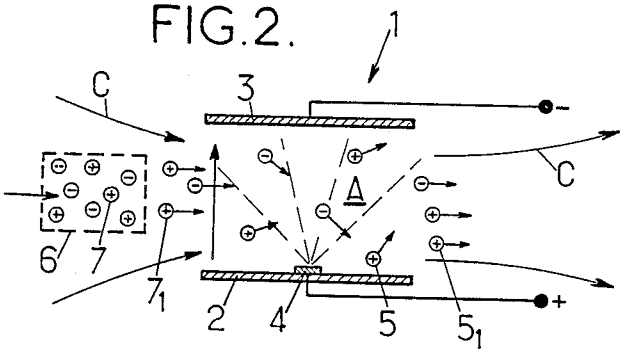

In the diagram of FIGS. 1 and 2, the ion reservoir 6 is situated at the side of chamber 1 and the ionic compensation described above implies then that the winds C travel in a well defined direction.

Figure 3:
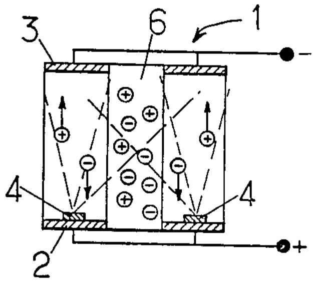
FIGS. 3 and 4 show again schematically two variants in accordance with the invention of such a smoke detector, during operation thereof without wind.
Figure 4:
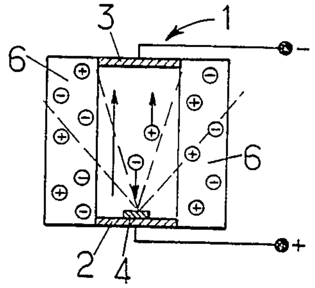

To provide such compensation for at least two opposite directions of travel of winds C, recourse is preferably had to one or other of the two solutions shown schnematically in FIGS. 3 and 4:

in the first solution, the ion reservoir 6 is situated inside chamber 1, in a central position, so as to be obligatorily swept by the winds in all cases before describing the end of their travel in the chamber, in the second solution, it is chamber 1 which is situated inside the ion reservoir 6, or at least which is enclosed by two portions of such a reservoir situated respectively at its inlet and at its outlet so that, in all cases, the winds to be neutralized begin by passing through an ion reservior portion before sweeping the chamber.

Again preferably, the detector is as a whole given a high symmetry of revolution about an axis so that it lends itself to substantially omnidirectional penetration of the ambient smoke.

Figure 5:
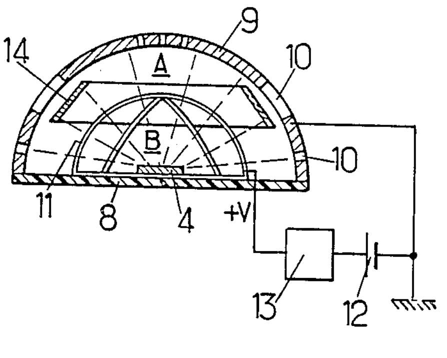
FIGS. 5 and 6 show respectively in axial section and in an external view one embodiment of such a detector in accordance with the invention.
Figure 6:
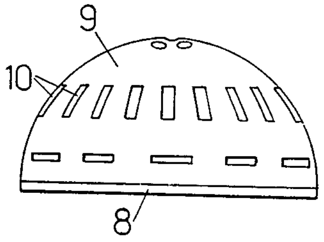

FIGS. 5 and 6 show in greater detail an embodiment in accordance with this last characteristic and with the first of the two above solutions.

The ionization chamber 1 is here defined by a flat and circular plate 8 made from an insulating material and by a hemispherical dome 9 made from metal or from a metallized plastic material, the circular edge thereof being fixed to the periphery of plate 8.

Said plate 8 is intended to be fixed against a wall or a ceiling defining premises to be surveyed or else against the internal face of an air conditioning duct to be monitored.

Dome 9 is perforated with annular series of apertures 10 causing its inner volume to communicate with the ambient atmosphere.

Inside dome 9 is placed a cage 11 made from metal or from a metallized plastic material which, like the dome, has a hemispherical shape and is centered in the center of this dome.

This cage is advantageously formed of a plurality of semicircular hoops crossed at the top thereof. At the center, common to the dome and to the cage is located the radioactive substance 4.

Cage 11 is connected to the positive pole of a DC current source 12 through a measurement and alarm assembly known per se and shown symbolically by the rectangle 13 and dome 9 is grounded.

This cage and this dome then play the roles respectively of the two above electrodes 2 and 3.

In FIG. 5 there can be further seen a truncated cone shaped deflector 14 disposed inside the dome just opposite a series of apertures 10 so as to deflect towards the cage the air currents introduced into the chamber through these apertures in order to reduce their input speed.

The operation of the detector thus described is as follows.

At rest, the measurement involves exclusively the ionization chamber which is formed by the curved zone A between cage 11 and dome 9.

The ions formed in this zone by the ionizing radiation coming from source 4 form an ionic current between the two electrodes formed by the two surfaces 9 and 11 and any presence of smoke in the immediate vicinity of the apparatus results in this smoke penetrating into said zone and so in a reduction of the ionic current in a way described above, which reduction sets off an alarm signal when it exceeds a predetermined threshold.

Simultaneously, the radiation emitted by substance 4 ionizes the volume B inside cage 11 and the ions thus formed in this cage remain imprisoned there, forming a "reserve" of such ions.

As long as the ambient atmosphere remains calm, the smoke penetrates calmly into zone A and causes no ions to be carred along from inside cage 11 to the outside thereof.

On the other hand, when a wind created in the vicinity of the apparatus appears in front of this latter, it is introduced through apertures 10, passes through the curved zone A then penetrates immediately into cage 11.

While passing through this cage, it sweeps it and picks up a certain number of ions which are there in reserve.

It then escapes from said cage while carrying along the ions thus picked up and, when it again passes through zone A, it enriches it with these ions picked up in the cage.

Finally, it escapes from the chamber while taking with it some of the ions circulating in zone A, but the number of ions finally removed from this zone by the wind considered does not substantially differ from that of the ions brought by this wind into this zone: there is therefore ionic compensation and the measurement is not disturbed by said wind.

The characteristics of the cages (dimensions, positions, shapes, constructions) are determined so that the ionic compensation obtained is optimum when winds appear with respect to which it is especially desirable to protect the detector.

In embodiments having given every satisfaction and mentioned solely by way of illustration, the electrodes were made from stainless steel or from a metallized plastic material, the DC electric voltage was +8 volts the external electrode was in the form of a perforated cylindrical cap of revolution of a diameter of 45 mm, the ion reservoir was in the form of an internal semispherical cage of revolution of 30 mm in diameter, and the smoke detection obtained was very insensitive to the air currents in that the speed of these air currents must pass 11 m/sec for the disturbance of the measuring current due to said air currents to reach 10% of the value of this current.

Following which, whatever the embodiment adopted, a smoke detector is finally obtained whose construction and operation follows sufficiently from the foregoing.

This detector has numerous advantages with respect to those known heretofor, in particular in so far as the efficiency of compensation with respect to winds, simplicity and reliability are concerned.

As is evident, and as it follows moreover already from what has gone before, the invention is in no wise limited to those of its embodiments and modes of application which have been more especially considered; it embraces, on the contrary, all variants thereof, more particularly:

those where plate 8 of the embodiment shown in FIGS. 5 and 6 is conducting instead of being insulating, this plate then being isolated from dome 9 by an insulating ring and itself forming one of the two electrodes of the ionization chamber, the inner cage being then brought to the same potential as said plate or to a different potential, preferably less if the cage is still inside the dome, and those where the above perforated dome 9 has a shape other than the hemispherical and cylindrical shapes of revolution explained above, for example a parallelepipedic shape, the shape of cage 11 being of course modified accordingly.

I claim:

1. Smoke detector with ionization chamber, characterized in that the smoke detector includes an ion reservoir comprising a volume which is electrically independent of said ionization chamber and bounded by a conductive cage so that ions created within said cage are not influenced by the electric field within the ionization chamber and, absent air currents, remain imprisoned within said cage and which is disposed relative to the ionization chamber so as to be swept by at least a part of the air currents introduced into said ionization chamber before the passage of the air currents through at least a part of said chamber.

2. Smoke detector according to claim 1, characterized in that said detector has a high symmetry of revolution about an axis so as to lend itself to substantially omnidirectional penetration of the ambient smoke.

3. Smoke detector according to claim 1, characterized in that the ion reservoir is disposed inside the ionization chamber.

4. Smoke detector according to claim 1, characterized in that the cage is formed by crossed semicircular hoops.

5. Smoke detector according to claim 1, characterized in that the cage forms one of the two electrodes of the ionization chamber.

6. Smoke detector according to claim 1, characterized in that the ionizing radiation source which generates the ions of the ionization chamber is the same as that generating the ions of the ion reservoir.

7. Smoke detector according to claim 1, characterized in that the ionizing radiation source is formed by a radioactive substance.

8. Smoke detector according to claim 1, characterized in that deflectors are provided for directing at least a part of the air currents coming from the outside towards the ion reservoir before introduction thereof into at least a part of the ionization chamber.

9. A smoke detector comprising an ionization chamber, and an ion reservoir comprising a volume which is electrically independent of said ionization chamber, which is bounded by a conductive cage so that ions created with said cage are not influenced by the electric field within the ionization chamber and, absent air currents, remain imprisoned within said cage, and which is disposed relative to said ionization chamber such that at least a portion of the air currents to which the ionization chamber is subjected pass through the ion reservior prior to the passage thereof through at least a part of said ionization chamber so that ions which exit from said ionization chamber in response to such air currents are replaced in said ionization chamber by ions from said ion reservoir, so as to compensate for the loss of the exiting ions.

* * * * *